United States Patent

Fudemoto et al.

[15] 3,671,886

[45] June 20, 1972

[54] METHOD AND APPARATUS FOR AUTOMATIC GAIN CONTROL

[72] Inventors: Isao Fudemoto, Tokyo; Tsutomu Yoshibayashi, Sagamihara; Tadao Miyamura, Kawasaki, all of Japan

[73] Assignee: Fujitsu Limited, Kanagawa-ken, Japan

[22] Filed: Aug. 28, 1970

[21] Appl. No.: 67,765

[30] Foreign Application Priority Data

Aug. 29, 1969 Japan....................................44/68533

[52] U.S. Cl................................333/18, 179/170.8, 330/29, 330/145, 330/94

[51] Int. Cl...........................................................H04b 3/04

[58] Field of Search..................333/18, 28; 330/29, 94, 145; 325/13, 62; 179/170.8

[56] References Cited

UNITED STATES PATENTS

| | | | |
|---|---|---|---|
| 2,719,270 | 9/1955 | Ketchledge | 333/18 X |
| 2,805,398 | 9/1957 | Albersheim | 333/18 X |

*Primary Examiner*—Paul L. Gensler
*Attorney*—Robert E. Burns and Emmanuel J. Lobato

[57] ABSTRACT

Disclosed herein is automatic gain control circuitry for a transmission line of a PCM regenerative repeater, wherein such circuitry uses multistage variable equalizing networks. Each network has a variable reactance element, and has a predetermined pole frequency which is automatically varied under the control of its associated reactance element. The pole frequencies are changes in proportion to the square of a ratio of a standard line loss to a changed line loss due to the line loss variation, both measured in db. Thus, the pole frequency changes compensate for variation of the line loss.

5 Claims, 5 Drawing Figures

METHOD AND APPARATUS FOR AUTOMATIC GAIN CONTROL

The present invention relates to an automatic gain control circuit used especially in a pulse code modulation system.

In a pulse code modulation system, signal pulses sent by a pre-stage regenerative repeater and transmitted through a line are equalized and amplified, and the level of the amplified signal pulse is compared with a threshold level of the regenerative repeater. The transmitted signal pulse is estimated as binary "1" or binary "0" value, according to whether the amplified signal level is larger or smaller than the threshold level. In the case of binary "1" value, a pulse signal corresponding to a binary "1" is regenerated and sent to a transmission line. In this case, when the level of the receiving pulses changes considerably by the variation of the characteristic features of a transmission line, such as a temperature change, binary "1" and "0" values of the signal are liable to be misjudged at the regenerative repeater. In order to prevent such failures, it has been customary to use either an automatic threshold control circuit (ATC), which changes the threshold level by detecting the characteristic variation of the transmission line, or an automatic gain control circuit (AGC), which holds the signal level at a constant value by changing the equalizing amplifier gain. In the above, for the purposes of increasing the degree of freedom of system design, it is very effective to use a $\sqrt{f}$ inclination AGC circuit (wherein $f$ is the transmission frequency), which changes the frequency characteristic of an equalizing amplifier gain with the inclination of $\sqrt{f}$ db corresponding to the frequency characteristic of the line loss. However, as will be discussed in detail, some difficult conditions exist with such an approach, especially in the high frequency range in the AGC circuit utilizing a $\sqrt{f}$ inclination control.

An object of the present invention is to overcome the drawbacks of the conventional automatic gain control circuit and to obtain an improved gain control circuit utilizable over a high frequency range.

Another object of the present invention is to provide an AGC circuit comprising a multistage variable equalizing network having variable reactance elements used in a PCM regenerative repeater, and to commonly control the variable reactance elements so as to change the pole frequencies of each stage in proportion to the square of a ratio of a standard line loss to a changed line loss due to the line loss variation.

Further features and advantages of the present invention will be apparent from the ensuing description with reference to the accompanying drawings. In such drawings.

Figure 1:
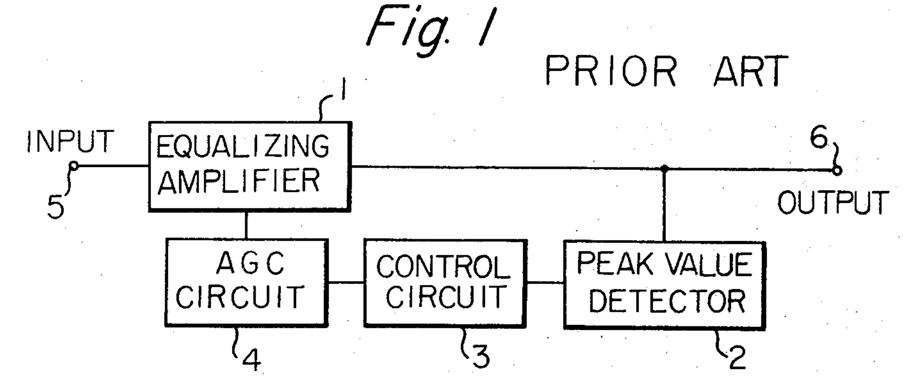
Fig. 1 PRIOR ART
FIG. 1 is an example of a block diagram showing a conventional automatic gain control circuit.

A conventional inclination AGC circuit, as illustrated in the block diagram of FIG. 1, is composed of an input terminal 5 connected to an equalizing amplifier 1, a peak value detector 2 which detects the peak value of an equalized waveform at an output terminal 6 of the equalizing amplifier 1, a control circuit 3 which amplifies the output of the peak value detector 2 and produces a control DC signal, and an AGC circuit 4 for approximating the line characteristic and having a variable element controlled by the control circuit 3.

In the above-mentioned conventional AGC circuit, including a Bode type variable equalizer, the AGC network approximates the loss frequency characteristic of the line loss variation, and by controlling a variable resistor element in accordance with the variation of the input 5, changes the loss characteristic of the variable equalizer and compensates the variation component. It is very difficult, however, to realize the conventional AGC circuit for a high frequency range with such a Bode type variable equalizer, because the domain of the loss variation compensation is limited within 2 Nepers; design of the network is very complex; and, it is necessary to use a variable resistor element together with an inductance coil.

The method and circuitry of the present invention overcomes the drawbacks of the above-mentioned conventional circuit, and the following is a detailed discussion of the invention.

The logarithmic relative value of the transmission loss in the transmission line at a high frequency range is approximately proportional to $\sqrt{f}$. Letting $K_0$ and $L$ denote, respectively, the standard line constant and standard line loss (in dB), the following relation exists:

$$L \approx K_0 \sqrt{f} \mathrm{dB}) \qquad (1)$$

In Equation (1), when $K_0$ and $L$ change to $K_1$ and $L'$, respectively, due to the variation of the line loss, the following relation is obtained:

$$L' \approx K_1 \sqrt{f} = K_0 \sqrt{f} (K_1/K_0)^2 \qquad (2)$$

Equation (2) defines the form of parallel displacement of the former line loss characteristic on the frequency axis by $(K_1/K_0)^2$, and as a result of this it is possible to compensate for the variation by shifting all the pole frequencies of the approximate networks by $(K_1/K_0)^2$, respectively. The present invention is an automatic gain control circuit utilizing this principle.

Figure 2A:
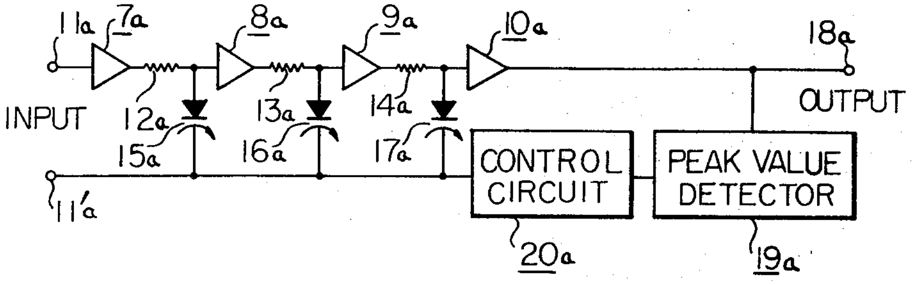
FIGS. 2A and 2B are block diagrams showing an automatic gain control circuit of the present invention.
Figure 2B:
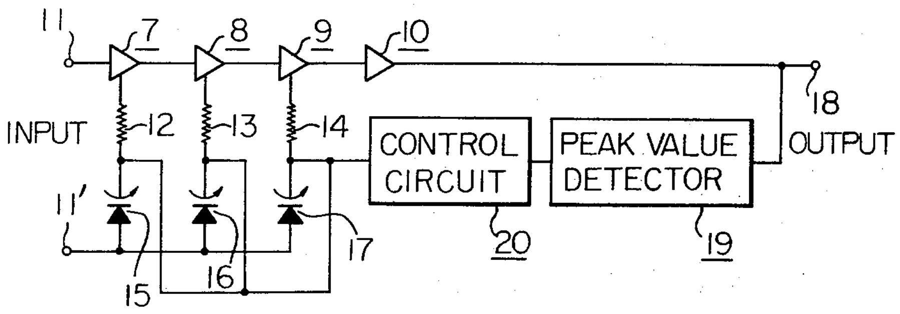

Referring to FIGS. 2A and 2B, the embodiment of the present invention comprises equalizing amplifiers 7, 8, 9, and 10, which obtain the desired equalizing waveform for the standard line characteristic; an input terminal 11 for the pulse distorted in the prior line; variable equalizing networks including resistances 12, 13, and 14 and commonly controlled variable capacitance semi-conductor elements 15, 16, and 17, which are provided to change the pole frequencies by varying the values of capacitances; an output terminal 18 which is provided for the equalized waveform output and also the input of a timing and discriminating regenerative circuit (not shown in the block diagram); a control circuit 20 including a DC amplifier to control the above-mentioned variable elements; and a peak value detecting circuit 19 to detect the peak value of an output equalized wave. In the case of FIG. 2A, the potentials at the three connection points of resistor **12*a* and variable capacitance element 15*a*, resistor 13*a* and variable capacitance element 16*a*, and resistor 14*a* and variable capacitance element 17*a***, are fixed at same constant DC level.

Figure 3:
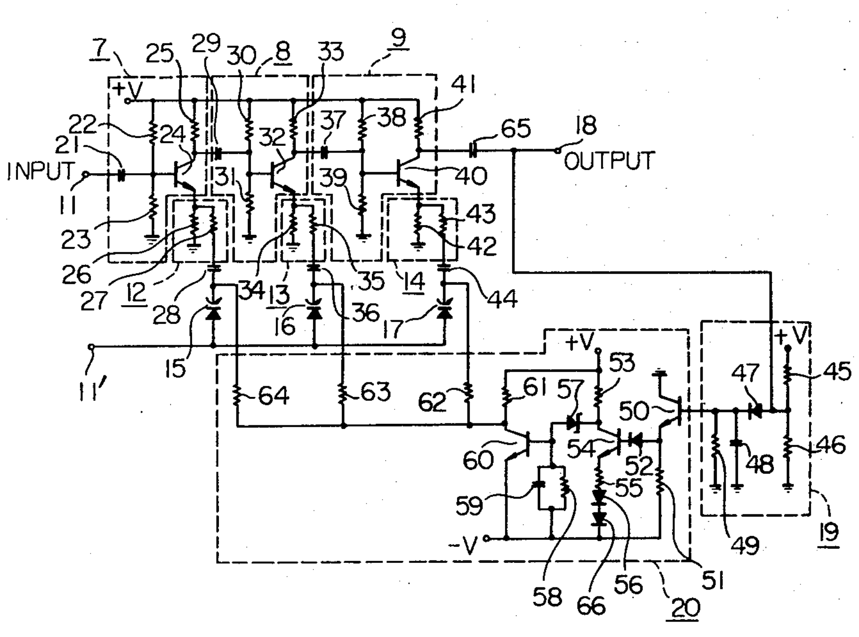
FIG. 3 is a detailed circuit diagram related to the circuit shown in FIG. 2B.

FIG. 3 shows a detailed schematic diagram relating to the block diagram of FIG. 2B, wherein the equalizing amplifier 7 and resistances 12 are shown to comprise a transistor 24, a capacitor 21, and resistors 22, 23, 25, 26, and 27. The capacitor 21, connected to the input terminal 11, is connected to the base of the transistor 24 and to a connection point of resistors 22 and 23 whose other terminals are connected respectively to a positive potential source V+ and to ground. The collector of transistor 24 is connected through the resistor 25 to the source +V, and the emitter of transistor 24 is connected through the resistor 26 to ground. The connection point of the emitter and the resistor 26 is connected through the resistor 27 and a capacitor 28 to the cathode of the variable capacitance semiconductor element 15 whose anode is connected to an input terminal 11'. The junction of the resistor 25 and the collector of the transistor 24 is connected through a capacitor 29 to the next stage equalizing amplifier 8. The connections of the equalizing amplifiers 8 and 9 and networks 13, 16, and 14, 17, are identical to those of equalizing amplifier 7 and network 12, 15, with the exception that the output capacitor 65, connected to amplifier 9, is connected to the output terminal 18, rather than to a succeeding amplifier.

The peak value detecting circuit 19 is composed of a rectifier diode 47, a capacitor 48, and resistors 45, 46, and 49. Output terminal 18 is connected to a connection point of the resistors 45 and 46 whose other terminals are respectively connected to the source +V and to ground. The anode of the rectifier diode 47 is connected to the output terminal 18, and its cathode is connected to a terminal of a parallel circuit composed of the capacitor 48 and resistor 49, the other terminal of which is grounded. The cathode of diode 47 is also connected to the base of a transistor 50 of the control circuit 20.

The control circuit 20 is composed of transistors 50, 54 and 60, resistors 51, 53, 55, 58, 61, 62, 63, and 64, diodes 52, 56 and 66, Zener diode 57, and a capacitor 59. A collector of the transistor 50 is grounded and its emitter is connected through the resistor 51 to a negative potential source −V. The connection point of resistor 51 and the emitter of transistor 50 is connected through a diode 52 to the base of the transistor 54 whose collector is connected through the resistor 53 to the source +V. The emitter of the transistor 54 is connected through a resistor 55, diodes 56 and 66 to the negative source −V. The junction of resistor 53 and the collector of transistor 54 is connected via Zener diode 57 to a terminal of a parallel circuit composed of the resistor 58 and capacitor 59, and the other terminal of such parallel circuit is connected to the source −V. The diodes 52, 56, and 66 and Zener diode 57 are provided for setting a DC level for the transistor 54, and the capacitor 59 is provided for preventing a parasitic oscillation in the control circuit 20. A connection point of the above-described parallel circuit and the anode of the diode 57 is connected to the base of the transistor 60 having its emitter connected to the negative source −V, and having its collector connected through a resistor 61 to the positive source +V. Finally, the collector of the transistor 60 is connected through resistors 62, 63, and 64, respectively, to the cathodes of the variable capacitance elements 17, 16, and 15 as shown in FIG. 3.

Each stage of the equalizing amplifiers has a predetermined pole frequency, and such frequencies are varied by the commonly controlled variable capacitance elements. When the input level at terminal 11 decreases, due to the line loss variation and in accordance with it, the output level of the equalizing amplifiers, at the terminal 18 decreases. The peak value detecting circuit 19 detects this level and the control circuit 20 operates so as to decrease the capacitance value of the variable capacitance elements 15, 16, and 17, so that each pole frequency of the equalizing amplifier is increased by $(K_0/K_1)^2$ of the line loss variation component, thus compensating for the line loss variation component. Similarly, when the input level increases, the operation will be inverse, so that the equalized output wave can be kept constant. In the embodiment illustrated in FIG. 3, three stages of variable equalizing networks are used; however, the number of stages can be selected according to the approximate degree of the desired networks.

Figure 4:
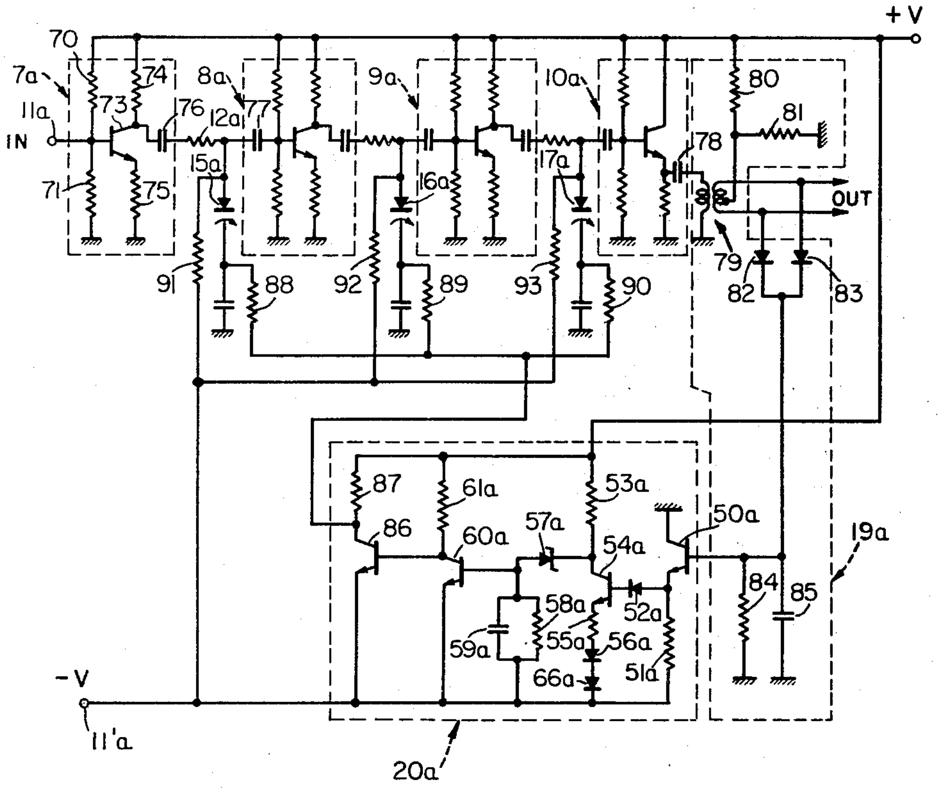
FIG. 4 is a detailed circuit diagram related to the circuit shown in FIG. 2A.

In a modification to the above-described embodiment, as shown in FIG. 4, the amplifiers *7a–10a* are all identical, and amplifier *7a* is shown as including a pair of bias resistors 70 and 71 connected in series between a positive potential source +V and ground. The junction of resistors 70 and 71 is connected to the input terminal 11a and the base of a transistor 73 having its collector coupled through a resistor 74 to the source +V, and its emitter coupled through a resistor 75 to ground. The output of the amplifier *7a* is coupled from the collector of the transistor 73 through a capacitor 76 to one terminal of the resistor 12*a* which forms a part of an equalizing network together with the variable semiconductor capacitor 15*a*. The capacitor 15*a* has its anode connected to the other terminal of resistor 12*a* and to a coupling capacitor 77 connected to the pair of bias resistors of the succeeding amplifier 8*a*. The connections of amplifiers 8*a*, 9*a*, and 10*a*, are identical to those of amplifier *7a*, with the exception that the amplifier 10*a* has its output coupling capacitor 78 connected to the primary of an output transformer 79, the secondary of which has a center tap connected to the junction of a pair of resistors 80 and 81 connected in series between the positive source +V and ground. The outer leads of the secondary of the transformer 79 comprise the output leads of the circuit and are connected respectively to the anodes of a pair of diodes 82 and 83 having their cathodes connected together and to one terminal of a parallel combination of a resistor 84 and capacitor 85 having its other terminal connected to ground. The components 79 and 85 comprise the peak value detector 19*a* which has its output taken from the junction of the diodes 82 and 83 and connected to the base of a transistor 50*a* in the control circuit 20*a*. The control circuit 20*a* is identical to the control circuit 20 in FIG. 3, with the exception that the output is cascaded through an additional transistor 86 having its base connected to the collector of transistor 60*a*, its emitter connected to the negative potential −V, and its collector coupled through a resistor 87 to the positive potential +V. The control output is taken off the collector of transistor 86 and coupled respectively through resistors 88, 89, and 90 to the cathodes of the semiconductor capacitors 15*a*, 16*a*, and 17*a*. The anodes of the capacitors 15*a*, 16*a*, and 17*a*, are connected respectively through resistors 91, 92, and 93 to the negative potential −V to complete the circuit.

The circuitry of the peak detector 19*a* in FIG. 4 comprises an improvement over that shown in FIG. 3 in that it detects the peak value of both positive and negative signals.

In the illustrated embodiments, each variable equalizing network is composed simply of a resistance and capacitance combination, but the present invention is not to be restricted by this composition.

By means of the method and circuitry of the present invention, the circuit construction becomes relatively simple, and automatic gain control at high frequencies is readily performed. Furthermore, the automatic gain control circuitry of the present invention can be constructed easily with integrated circuits.

Modifications of the circuitry disclosed herein will occur to those skilled in the art, and various combinations of the circuit will be capable of use together for achieving the desired results of the invention. The scope of the invention is to be interpreted accordingly as defined by the appended claims.

What we claim is:

1. A method for compensating for line losses in a transmission line comprising the steps of connecting a plurality of equalizing networks in cascade in a transmission line, each said network having a variable reactance element, and varying the reactance of each element to change the pole frequencies of said networks in proportion with the square of the ratio of a standard line loss to a changed line loss due to a line loss variation, the reactance of said elements is varied by the steps of detecting the output of said cascade connected networks, varying a DC control voltage in response to changes in said output, and applying said DC control voltage to each reactance element to change said pole frequencies of said networks.

2. Automatic gain control circuitry for a transmission line comprising a transmission line, a plurality of variable equalizing networks connected in series, said series combination of networks having an input and an output connected in said transmission line, detector means connected to one of said equalizing networks for detecting an output signal thereof, control circuit means connecting said detector means to each of said equalizing networks for varying the pole frequencies of said plurality of networks according to the square of the ratio of a standard line loss to a changed line loss due to a line loss variation, said detector means comprising a peak value detector circuit for detecting line loss variations, said control circuit means comprising means for varying a DC control voltage in response to changes in said output signal detected by said peak value detector circuit, and said equalizing networks including variable reactance elements having said DC control voltage coupled thereto to vary said network pole frequencies.

3. The invention as set forth in claim 2, in which each said equalizing network includes an amplifier and one of said variable reactance elements comprising a semiconductor capacitor, and in which each said semiconductor capacitor is coupled to said DC control voltage in said control circuit means.

4. A method for compensating for line losses in a transmission line comprising the steps of connecting a plurality of equalizing networks in cascade in a transmission line, each said network having a variable reactance element, applying a DC control voltage derived from the transmission line to each element to vary the reactance of each said element to change the pole frequencies of said networks in proportion with the square of the ratio of a standard line loss to a changed line loss due to a line loss variation, and prior to varying the reactance of each said element deriving the DC control voltage varied in response to changes of an output of the networks.

5. A method for compensating for line losses in a transmission line as set forth in claim 4, in which the control voltage is derived by the steps of detecting the output of said cascade connected networks, varying a DC control voltage in response to changes in said output.

* * * * *